Feb. 24, 1970     O. C. SLATER ET AL     3,496,668

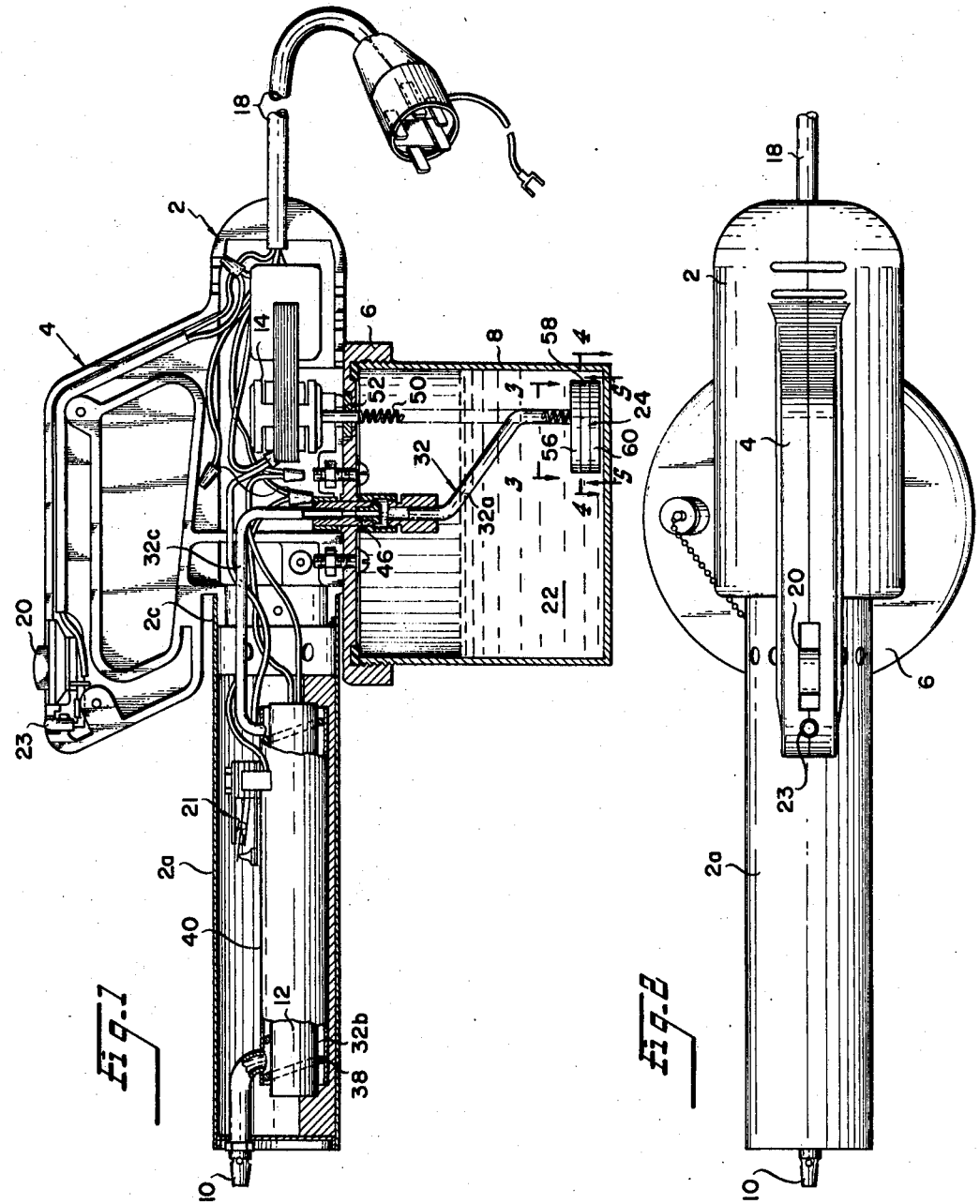

INSECTICIDE FOGGER APPARATUS

Filed April 4, 1968     2 Sheets-Sheet 2

INVENTOR
Owen C. Slater
Donald F. Kleinke
Walther Richter

BY Lawrence E. Laubscher
ATTORNEY

United States Patent Office 3,496,668
Patented Feb. 24, 1970

3,496,668
INSECTICIDE FOGGER APPARATUS
Owen C. Slater, Racine, Donald F. Kleinke, Greenfield, and Walther Richter, Milwaukee, Wis., assignors to Dittmore-Freimuth Corporation, Milwaukee, Wis., a corporation of Wisconsin
Filed Apr. 4, 1968, Ser. No. 718,780
Int. Cl. A01m *19/00*
U.S. Cl. 43—129
9 Claims

ABSTRACT OF THE DISCLOSURE

Improved portable fogger apparatus, including motor driven gear pump means for pumping liquid insecticide at a first pressure for conveyance to a nozzle via a dry-fog-producing vaporization chamber. Specifically designed flow restrictor means are provided between the pump and the vaporization chamber to reduce the liquid pressure to a desired second pressure value, whereby the backflow pressure of the spray nozzle means is compensated for regardless of insecticide temperature.

SPECIFICATION

As evidenced by the prior patents to Johnson et al. No. 3,074,199, Braun et al. No. 1,497,428, Andrews No. 2,765,578, and Davis No. 3,134,191, various types of portable insecticide spraying and/or fogging devices have been proposed for generating a mist or fog of pesticide particles to contact and subsequently kill insects passing therethrough. By definition, a liquid fog may be distinguished from a liquid spray by the size of the droplets, since a fog generally has a particle size of 0.1 to 100 micrometers, and an atomized spray has a range from 100 to 400 micrometer particle sizes. As distinguished from a spray which is a wet mist capable of condensing on surfaces to cause a moist film, a fog composed of extremely fine particles has the ability to remain in the air for a greater length of time and will not re-condense.

In accordance with the present invention, improved apparatus has been provided for producing a continuous output of dry fog, said apparatus including a vaporizing chamber that progressively heats the fluid material as it progresses through the chamber, and completes the vaporization as it leaves the end of the chamber. The proper balance of the effective area of the vaporization chamber from the pre-heating to the vaporizing stage guarantees minimum insecticide breakdown and carbon deposits inside the vaporization chamber. Since many more particles of fog are produced and each particle contains its proportion of insecticide, much more of the atmosphere is filled with this insecticide fog, thereby enabling it to penetrate cracks, crevices and minute pores of walls and structures, to hunt out the pests and insects and expose them to more fog. Another advantage achieved by the present invention is the alleviation of the hazard of fire, since by accurately maintaining a fine particle fog, the specific oxygen content of the surrounding atmosphere for sustaining combustion of the inflammable insecticide is safely reduced.

The primary object of the present invention is to provide an improved insecticide dry fogging apparatus including gear pump means for pumping fluid from a receptacle to spray nozzle means via a vaporization chamber, flow restrictor means being provided for reducing the pump output pressure to a selected second pressure that equals or slightly exceeds the back pressure of the nozzle means. In accordance with an important feature of the invention, the gear pump means are supported in the bottom of the liquid insecticide receptacle by a rigid first conduit portion that is rigidly connected at one end with the fogger housing body, said gear pump means being driven—via a flexible coupling—at a constant speed by a motor also mounted in the housing body. In one embodiment, the vaporization chamber comprises a helical passage defined by a metal wire coil the turns of which are wound about a resistance heater element and about which is concentrically fitted a tubular sleeve. In a second embodiment, the vaporization chamber comprises a tubular brass conduit wound helically about the resistance element and embedded in a cast heat-conductive shell.

A more specific object of the invention is to provide a fogger apparatus of the type described above, wherein the gear pump includes a simple assembly of horizontal circular top, intermediate and bottom plates, said intermediate plate containing a gear cavity for receiving a pair of intermeshing gears. The lower plate has a planar smooth upper surface supporting the gear pair, and the upper plate has a planar lower surface portion adjacent said driven gear. Consequently, construction cost of the gear pump is reduced and bearing friction is avoided by permitting the driven gear to float relatively freely in the gear cavity, whereby the efficiency of the gear pump is significantly increased. Owing to the critical nature of the design relationships between the pump, flow restrictor and vaporization chamber pressures relative to the nozzle back flow pressure, a sturdy, dependable and efficient insecticide dry fogger apparatus is achieved.

Other objects and advantages of the invention will become apparent from a study of the following specification, when viewed in the light of the accompanying drawing, in which:

FIG. 1 is a longitudinal sectional view of the insecticide fogger apparatus;

FIG. 2 is a top plan view of the apparatus of FIG. 1;

Figure 3:
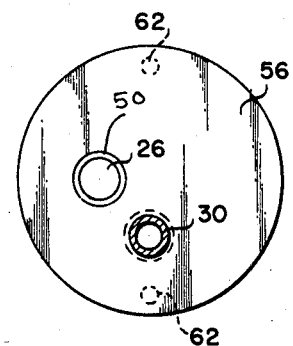
Figure 4:
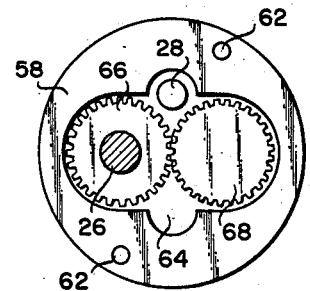
Figure 5:
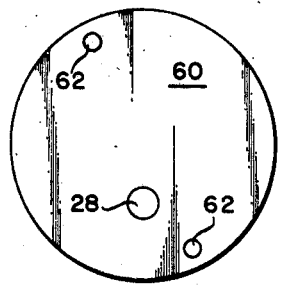
Figure 6:
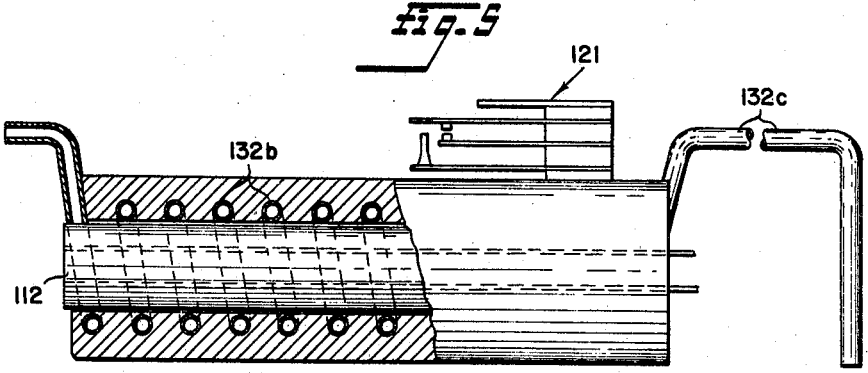

FIGS. 3, 4 and 5 are detailed views of the pump means taken along lines 3—3, 4—4 and 5—5, respectively, of FIG. 1; and FIG. 6 is a partly sectional detailed view of a second embodiment of the invention.

Referring first more particularly to FIGS. 1 and 2, the insecticide fogger apparatus comprises a rigid housing 2 having a handle portion 4 and an internally threaded cover or cap portion 6 by means of which the liquid insecticide receptacle 8 is removably connected therewith. Carried at one end of the housing is a fogger nozzle 10, and mounted within the housing are an electrical resistance heater element 12, and a vertically arranged electric motor 14, which motor is preferably a substantially constant speed shaded pole induction motor with self-aligning sintered bronze bearings lubricated with extra large oil-saturated felts. The motor 14 is energized from a conventional source via cable 18 and an off-on switch 20 mounted in the housing handle 4, and the resistance heater element is energized from the cable 18 via a parallel network including thermostat 21 and indicator lamp 23.

In order to pump the liquid insecticide 22 from the receptacle 8 to the nozzle means 10, gear pump means 24 are arranged in the bottom of the receptacle, said pump means including a pump shaft 26, a liquid inlet 28, and a liquid outlet 30. Communication between the pump outlet 30 and the nozzle means 10 is afforded by conduit means 32 inluding a rigid first section 32a that is threadably connected between the housing 2 and the pump outlet 30 to support the pump adjacent the bottom of the receptacle 8. The conduit means includes also a helical second portion 32b arranged concentrically about and in heat exchange relationship with the heater element 12. More particularly, in the embodiment of FIGS. 1 and 2, the helical second conduit potrion 32b comprises a vaporization chamber defined by the space between the turns of a metal wire helix 38 wound concentrically about the heater element 12, and an outer metal sleeve 40 mounted contiguously about the wire turns.

Although the body portion of the housing 2 is preferably molded from a synthetic plastic material such as a colored high impact phenolic resin, it is apparent that it could be formed of other suitable materials as well. The protective housing portion 2a surrounding the heater element 12 and the thermostat means 21 comprises a lightweight metal sleeve that is removably fitted at one end on a corresponding tubular portion 2c of the housing body.

In accordance with the present invention, the conduit means 32 is provided with series-connected flow restrictor means 46 for reducing the pressure of the liquid pumped to the vaporizing chamber 32b, whereby the restrictor means compensates for the back pressure of the nozzle means 10 to achieve fogging at a substantially constant flow rate regardless of the temperature condition of the insecticide relative to the vaporization chamber. In the illustrated embodiment, the flow restrictor means 46 comprises a tubular fitting connected between the first conduit section 32a and the intermediate conduit section 32c leading to the vaporizing chamber 32b, said fitting having in the preferred embodiment a bore of about .017 inch in diameter, and a length of about 0.25 inch.

The gear pump 24 is driven at a constant speed by the motor 14 via flexible coupling 50, which in the illustrated embodiment, comprises a coil spring the ends of which are fitted upon the motor shaft 52 and the pump shaft 26 (FIG. 3), respectively. The gear pump includes circular flat top, intermediate and bottom plates 56, 58 and 60, respectively, said plates being rigidly connected as an assembly (for example, by the vertically upwardly extending screws 62). As shown in FIG. 4, the intermediate plates 58 contains a gear chamber 64 that rotatably receives and peripherally conforms in configuration with the intermeshing drive and driven gears 66 and 68, respectively. The gear chamber 64 communicates with the bottom of the receptacle 8 via liquid inlet 28 contained in the bottom plate 60, and with conduit 32 via liquid outlet 30 contained in upper plate 56. With gears having a 3/8-inch pitch diameter, an optimum face width of .119 to .120 inch is preferable, so that with a conventional 110 volt, 3000 r.p.m. motor and with a peripheral clearance between the gears and the wall of gear chamber 64 on the order of .001 inch, the pump capacity is about 18 p.s.i.

The drive gear 66 is supported on the planar upper surface of bottom plate 60 and is rigidly secured to the lower end of pump shaft 26, which shaft extends upwardly through a corresponding opening in the top plate 56. The driven gear 68 has planar upper and lower surfaces that are adjacent and parallel with corresponding planar surfaces on the top and bottom plates, said driven gear being freely and floatably supported in the gear chamber 64 whereby the provision of bearings means for the driven gear and the attendant friction thereof are avoided.

OPERATION

Assume that the receptacle is provided with a liquid insecticide having the following chemical composition, by weight:

| | Percent |
|---|---|
| Shell chemical Co. "Vapona" (2,2-dichlorovinyl dimethyl phosphate and related compounds) | 0.50 |
| Rohm and Haas "Lethane" (beta-butoxy beta-thiocyano diethyl ether) | 1.59 |
| Petroleum hydrocarbons (75%, by volume, Anderson-Prichard deodorized kerosene No. 467, and 25% mineral seal oil) | 97.91 |

Assume also that the thermostat has a set temperature of 565° F. and is similar to the Pace, Inc. Model J–258, that the motor has a rated speed of 3000 r.p.m., and that fogger apparatus operates at 110 volts, 6 amps and 675 watts. Upon plugging of the cable into a conventional power source, the resistance element 12 begins to heat up until the set temperature of the thermostat (in this case, 565° F.) is reached, whereupon the thermostat 21 opens and the pilot light 23 becomes de-energized. Normally, this preparatory heating of the apparatus occurs in about two to three minutes. The operator then actuates the switch 20 to operate the motor 14, whereupon gear pump 24 is driven to pump the liquid insecticide into first conduit section 32a at an initial pressure of 18 p.s.i., and a flow-rate of about 1½ oz. per minute. As the insecticide passes through flow restrictor 46, the pressure is reduced to approximately 9 p.s.i. for introduction into the helical vaporizing chamber 32b via intermediate conduit section 32c. The back pressure from nozzle 10 confines the flow to allow sufficient time to completely vaporize the insecticide, and no liquid whatsoever is emitted from the nozzle 10. The liquid that is consumed from the receptacle at a rate of 1.5 fluid ounces per minute is vaporized to produce 9000 cu. ft. per minute of dry fog. At this rate, an average size room will be filled in a matter of minutes with a one quart size container 8. The fogging continues until the container is exhausted, or until the handle switch 20 is opened. Preferably, after turning off the pump motor, the electrical cord is left plugged into the receptacle for an additional 3 minutes or so in order to complete the vapirozation of any material left in the vaporizing chamber.

Referring to the modification of FIG. 6, as an alternative to the vaporization chamber construction of FIG. 1, the vaporization chamber may comprise a helical conduit section 132b (for example, 3/16" O.D. brass tubing) mounted concentrically about the electrical resistance heater element 112, said conduit section being embedded in a shell cast of suitable heat-conductive metal, such as aluminum. This shell provides a more complete distribution of heat from the heating element the entire external surface of the surrounding tubing, thereby affording improved vaporization of the insecticide. The shell also presents a more stable mechanical configuration, thus minimizing breakdowns after extended use. Owing to the improved heat path to the thermostat, closer control over the operation of the thermostat is permitted.

While in accordance with the provisions of the patent statutes the preferred forms and embodiments of the invention have been illustrated and described, it will be apparent to those skilled in the art that various changes and modifications may be made without deviating from the invention.

What is claimed is:
1. Insecticide fogging apparatus comprising
   (a) a housing;
   (b) fogger nozzle means carried by said housing;
   (c) electric resistance heater means mounted in said housing;
   (d) an insecticide receptacle removably connected with said housing; and
   (e) means for pumping liquid insecticide from said receptacle to said nozzle means, comprising
      (1) gear pump means including a liquid inlet, a liquid outlet and a drive shaft;
      (2) conduit means affording communication between said pump outlet and said nozzle means, said conduit means including
         (a) a first section rigidly connected between said housing and said pump means for supporting said pump means adjacent the bottom of said receptacle;
         (b) a second section in heat exchange relation with said heater means; and
         (c) flow restrictor means connected in series between said pump means and said nozzle means;
      (3) an electric motor mounted in said housing, said motor having a motor shaft; and
      (4) connecting means connecting said motor and pump shafts.

2. Apparatus as defined in claim 1, wherein said second conduit section comprises a helical passage arranged concentrically about said heater element.

3. Apparatus as defined in claim 2, and further including a metal shell arranged concentrically about said heater element, said helical passage comprising a helical conduit embedded in said metal shell.

4. Apparatus as defined in claim 1, wherein said pump means is arranged vertically and includes horizontal bottom, middle and top plates, said middle plate including a gear-train-conforming cavity, and intermeshing drive and driven gears mounted in said cavity, said drive gear being connected with said pump shaft and said driven gear having planar end surfaces.

5. Apparatus as defined in claim 4, wherein said gears have a peripheral clearance of about .001 inch, and further wherein said top and bottom plates have planar support surfaces parallel with and immediately adjacent said driven gear end surfaces.

6. Apparatus as defined in claim 5, wherein said connecting means comprises a flexible shaft.

7. Apparatus as defined in claim 6, wherein said pump means has a delivery rate of 1.5 fluid ounces per minute.

8. Apparatus as defined in claim 7, wherein said pump has a capacity of about 18 p.s.i., and wherein the flow restrictor means comprises a passage having a diameter of about .017 inch and a length of about .25 inch, said flow restrictor being arranged to effect a reduction in pressure of the fluid supplied to the vaporization chamber to about 12 p.s.i.

9. Apparatus as defined in claim 8, wherein the gears have a ⅜-inch pitch diameter and a face width of about .120 inch.

References Cited

UNITED STATES PATENTS

| | | | |
|---|---|---|---|
| 2,402,402 | 6/1946 | Hickman | 43—129 |
| 2,576,976 | 12/1951 | Stagner | 43—129 X |
| 3,200,535 | 8/1965 | Hession | 43—129 |

WARNER H. CAMP, Primary Examiner

U.S. Cl. X.R.

252—359